United States Patent [19]

Missler

[11] Patent Number: 4,913,014

[45] Date of Patent: Apr. 3, 1990

[54] BAND-SAWING MACHINE

[76] Inventor: Patrick Missler, 12, Rue de Tournehem, F-91450 Etioles, France

[21] Appl. No.: 258,666

[22] Filed: Oct. 17, 1988

[30] Foreign Application Priority Data

Oct. 20, 1987 [FR] France ................................ 87 14438

[51] Int. Cl.⁴ ............................................ B23D 53/00
[52] U.S. Cl. .......................................... 83/72; 83/800
[58] Field of Search ................ 83/72, 13, 56, 62.1, 83/800, 801, 794, 796, 799

[56] References Cited

U.S. PATENT DOCUMENTS

| | | | |
|---|---|---|---|
| 2,958,347 | 11/1960 | Blum et al. | 83/819 X |
| 4,170,915 | 10/1979 | Sato | 83/800 |
| 4,357,848 | 11/1982 | Sakurai et al. | 83/801 |
| 4,358,974 | 11/1982 | Sakurai | 83/13 |
| 4,620,465 | 11/1986 | Taguchi | 83/74 |

FOREIGN PATENT DOCUMENTS 2129813 4/1985 Fed. Rep. of Germany .
2556258 8/1986 France .
2052107 1/1981 United Kingdom .

*Primary Examiner*—Douglas D. Watts
*Assistant Examiner*—Eugenia A. Jones
*Attorney, Agent, or Firm*—Young & Thompson

[57] ABSTRACT

A band-sawing machine is provided opposite to the intended workpiece location with a movable work unit comprising the saw-band and its drive mechanism. The rate of travel of said movable work unit is reduced by a hydraulic circuit provided with a device for regulating the rate of flow. In addition, the hydraulic circuit includes a valve which is capable of limiting or even of interrupting the flow of fluid. The operation of the valve is controlled by a means responsive to an increase in the resistance set up in opposition to the driving tension of the saw-band. The arrangement is such that an increase in said resistance produces a limitation of the flow rate within the hydraulic braking circuit and consequently a reduction in the rate of travel of the movable work unit.

2 Claims, 3 Drawing Sheets

BAND-SAWING MACHINE

BACKGROUND OF THE INVENTION

1. Field of the Invention

The present invention relates to band-sawing machines which are intended to be employed for sawing metal parts such as metal bars or the like.

2. Description of the Prior Art

In the case of horizontal band-saws, these machines have a movable work unit placed above the intended location of the workpiece to be sawn, said unit being constituted by the band as well as its drive mechanism. Penetration of the band takes place by vertical displacement of the work unit under the action of its weight alone. However, this movement, which determines the rate of penetration of the band, is braked by a hydraulic device having a leakage circuit provided with a flow-rate regulator.

As a general rule, machines of this type are provided with safety systems having the function of stopping their operation in the event of overload or of failure of the band. Thus French patent No. 2,556,258 describes a sawing machine in which a feeler is placed in contact with the back of the saw-band and which is capable of producing action on a device for initiating stoppage of downward motion of the movable work unit in the event that the force applied to said feeler exceeds a predetermined threshold value. In addition, provision is made between said feeler and the device controlled by this latter for an intermediate element which is capable of producing a modification of the conditions of action of the feeler on the member for stopping the movable work unit as a function of the width of the part to be sawn.

However, this does not make it possible to obtain a sufficient degree of operational safety of sawing machines of the type considered. It is in fact necessary to ensure that the cutting force never exceeds both the possibilities of mechanical resistance of the saw-band body and the possibilities of frictional drive of said saw-band. In point of fact, when many teeth of the band are engaged, this results in an increase in the resistance set up in opposition to the band drive, which is in turn liable to produce rapid degradation and failure of the band.

In order to overcome this drawback, it has already been proposed to equip sawing machines of this type with an electronic regulating device for adjusting the rate of travel of the band as a function of the stresses sustained by this latter. However, a device of this type is particularly complex and costly as well as inconvenient to use.

It is for this reason that the present invention is directed to a sawing machine having a regulating system of very simple design which is capable of automatically ensuring satisfactory operational safety in the event of increase in the resistance set up in opposition to the saw-band drive.

SUMMARY OF THE INVENTION

Said band-sawing machine is provided opposite to the intended workpiece location with a unit comprising the saw-band and its drive mechanism, said unit being capable of moving towards the workpiece and the rate of travel of said unit being reduced by a hydraulic braking circuit provided with a device for regulating the rate of flow. Said sawing machine is distinguished by the fact that provision is made for a self-regulating system which is capable of coming into operation in the event of an increase in the resistance set up in opposition to forward motion of the saw-band. Said system is constituted on the one hand, within the hydraulic braking circuit, by a valve which is capable of limiting or even of interrupting the flow of fluid and on the other hand by a means for controlling said valve, said control means being associated with mechanical, hydraulic or like means for actuating the band-driving wheel and being capable of producing action on the corresponding valve of the hydraulic braking circuit in the event of an increase in resistance set up in opposition to the driving tension of the saw-band so that said increase produces a limitation of the flow rate within the hydraulic braking circuit and consequently a reduction in the rate of travel of the movable work unit.

Thus said reduction in rate of travel automatically produces a reduction in the resistance which acts in opposition to forward motion of the saw-band and therefore achieves automatic regulation. This makes it possible to avoid incidents of operation which would arise without a regulation of this type.

In an advantageous embodiment of the present machine, the band-driving wheel is driven in rotation by a driving member which acts on said wheel by means of a variable-tension spring, the valve for limiting the flow rate within the hydraulic braking circuit being so arranged as to be actuated by said driving member in the event that the resistance set up in opposition to the driving tension exceeds the value for which the spring is adjusted.

This form of construction is particularly suitable in the case in which the band-driving wheel is driven by an electric motor. However, the drive can also be effected by a hydraulic motor, in which case provision is made in the supply circuit of said motor for a branch line terminating in a jack placed opposite to the flow-limiting valve provided in the hydraulic braking circuit for reducing the rate of travel of the movable work unit.

DESCRIPTION OF THE PREFERRED EMBODIMENTS

Figure 1:
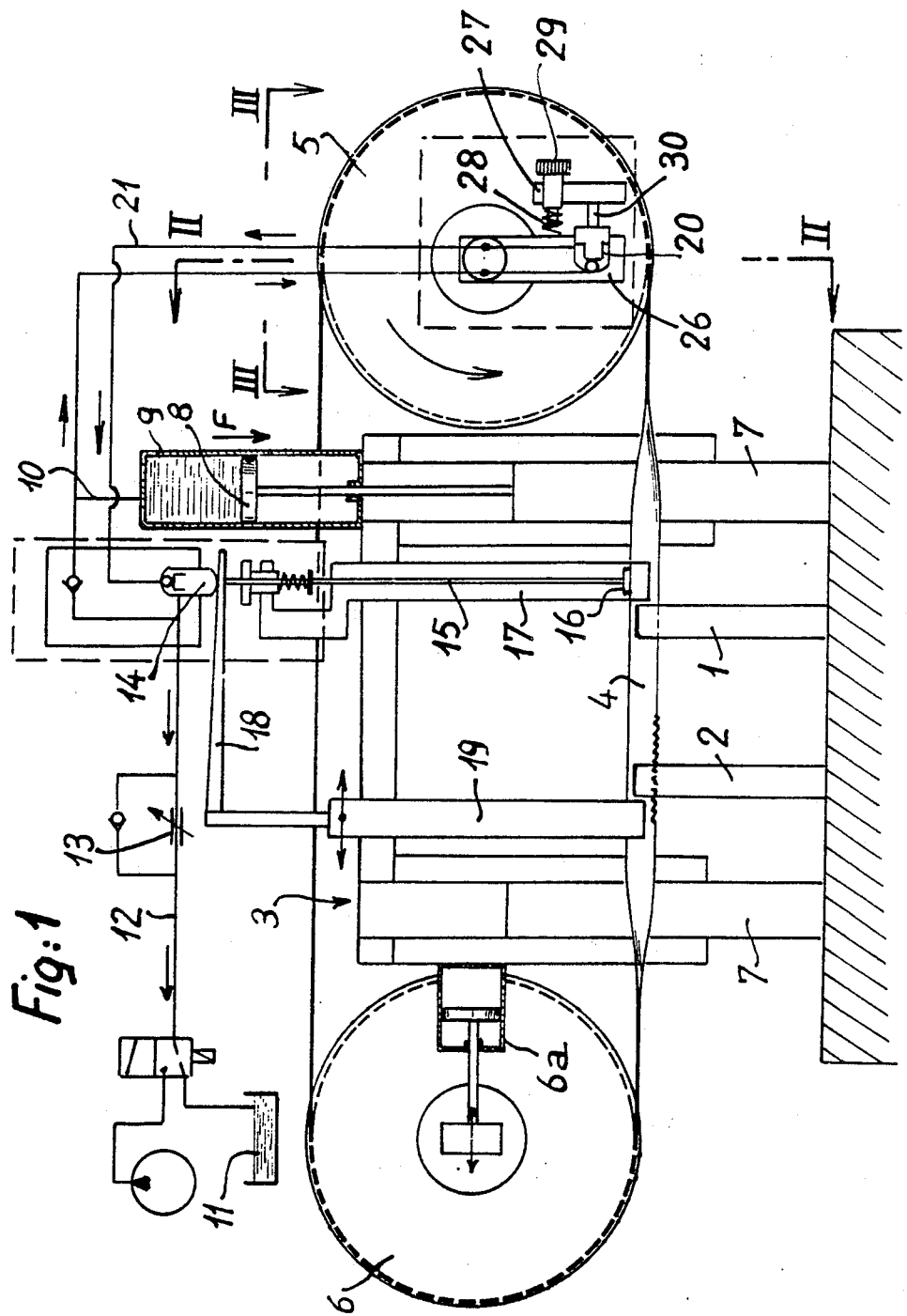
FIG. 1 is a schematic view in front elevation of a sawing machine in accordance with the invention.
Figure 2:
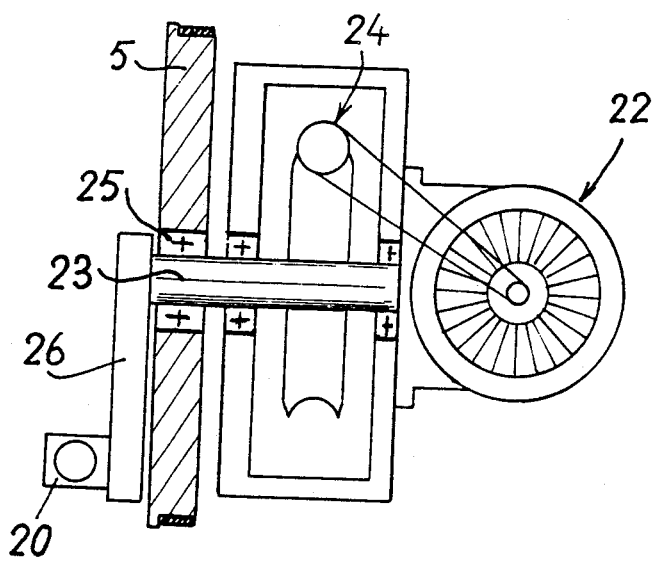
FIGS. 2 and 3 are partial views in cross-section respectively along the lines II—II and III—III of FIG. 1 but to a different scale.
Figure 3:
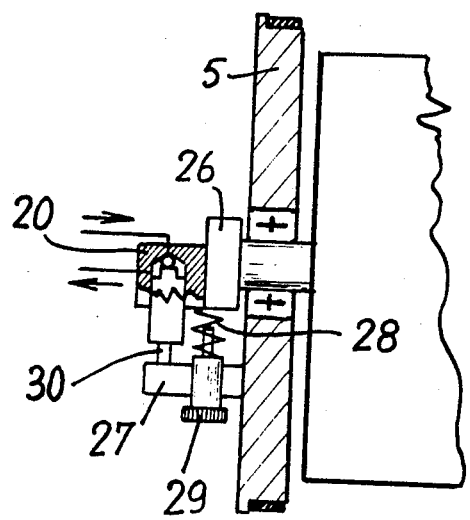

The sawing machine shown in FIGS. 1 to 3 is of the type in which the saw band or blade is placed horizontally in its work zone. At the intended location of the workpiece to be sawn, this machine has a clamping vise comprising two stationary jaws 1 and two movable jaws 2. Said movable jaws are mounted on guides (not shown) and their positions can thus be adjusted as a function of the width of the workpiece.

Above said vise, provision is made for a movable work unit designated by the general reference 3 which comprises the saw-band 4 and its drive mechanism consisting of a driving wheel 5 and a driven tensioning wheel 6. These two wheels are disposed in the same vertical plane on each side of two vertical columns 7 which form part of the fame and on which the movable work unit 3 is slidably mounted. The tensioning wheel 6 is slidably mounted on a horizontal guide and a hydraulic jack 6a produces action on this latter in order to ensure tensioning of the saw-band 4. The band-wheel 5 is driven in rotation by means of a special device which will be described in detail hereinafter.

The arrangement is such that the movable work unit 3 slides freely on the two columns 7 so that its downward movement takes place solely under the action of its own weight. However, this movement is braked by a hydraulic device comprising a stationary piston 8 housed within a cylinder 9 which is rigidly fixed to the frame of the movable unit 3. The upper portion of said cylinder is filled with oil and this oil is discharged from said cylinder as the movable unit 3 moves downwards in the direction of the arrow F. The fluid is evacuated via the leakage pipe 10 which is connected to the upper end of the cylinder 9 and terminates in a storage tank 11 via another pipe 12. Said pipe 12 is fitted with a flow-regulating device 13. Accordingly, it is this device which determines the braking force applied to the movable unit 3 and consequently the rate of downward travel of this latter.

In the same manner as in the sawing machine described in French patent No. 2,556,258, provision is made in said hydraulic braking circuit for a safety system which is capable of initiating stoppage of the movable unit 3 in the event of overload of the band 4. The safety system comprises a device 14 which has the function of shutting-off the hydraulic braking circuit and which is connected in the pipe 12. This device can be actuated by a vertical rod 15, the lower end of which is adapted to carry a feeler 16 placed in contact with the back of the band 4. Said rod is carried by a vertical arm 17, the end of which constitutes one of the band guides.

However, an intermediate element is interposed between the device 14 which forms a valve and the upper end of the sliding rod 15 in order to modify the conditions of actuation of the feeler as a function of the width of the workpiece. Said intermediate element is constituted by the free end of a horizontal bar 18 which is fixed as a cantilevered extension on the upper end of a vertical arm 19, the lower end of which constitutes the second element for guiding the band 4. This second vertical arm is in fact mounted so as to be capable of displacement on the frame of the movable unit 3 in the transverse direction and is subjected to the action of resilient thrust means (not shown) which maintain it in position against the movable jaws 2 of the clamping vise. Thus the position of said vertical arm 19 is directly a function of the width of the workpiece. The same accordingly applies to the horizontal bar 18. This latter in fact has a ramp constituting a cam, the profile of which is intended to produce a modification of the conditions of actuation of the feeler 16 on the shut-off valve 14 as a function of the width of the workpiece. As explained in French patent No. 2,556,258, the system as thus constituted is capable of ensuring the requisite degree of safety in the event of an increase in resistance set up in opposition to penetration of the band into the workpiece.

However, as mentioned in the introductory part of the present specification, this is not sufficient to satisfy all the requisite conditions of safety. It is for this reason that the machine under consideration is equipped with a self-regulating system which is intended to come into action in the event of any increase in resistance to driving of the saw-band, this phenomenon being wholly different from that of an increase in resistance to penetration of the band into the material of the workpiece.

This self-regulating system is designed to produce action on the braking circuit of the movable unit 3 in order to ensure a reduction in the rate of downward travel, in the event of an excessive increase in resistance to driving of the band 4. This self-regulating system comprises a valve 20 inserted in a pipe 21 which serves to connect the discharge pipe 10 of the cylinder 9 to the pipe 12 which terminates in the storage tank 11. The valve 20 is capable of ensuring a reduction in flow rate or even of interrupting the flow. To this end, said valve is controlled by a means responsive to an increase in the tension of the saw-band 4.

In the example shown in FIGS. 1 to 3, the band-driving wheel 5 is driven from an electric motor 22. This motor is coupled with a drive shaft 23 by means of a worm and wormwheel coupling system 24. However, the driving wheel 5 is not coupled directly in rotation with the drive shaft 23 since it is free with respect to this latter by virtue of the fact that it is mounted on antifriction bearings 25 provided around said shaft.

The band-wheel 5 is driven in rotation by means of a radial arm 26 which is carried by the free end of the shaft 23 and which is placed opposite to one of the faces of said band-wheel. The free end of said arm bears on a stop 27 carried by the band-wheel 5, thus ensuring that this latter is driven in rotation. However, the radial arm 26 does not bear directly on the stop 27 but through the intermediary of a spring 28, the initial tension of which can be adjusted by operating a screw 29. In fact, the body of the safety valve 20 itself is fixed on the radial arm 26 opposite to a push-rod 30 carried by the stop 27 or directly by the band-wheel 5. A communication is established between the valve body 20 and the hydraulic circuit by means of a rotary coupling (not shown in the drawings).

By virtue of the arrangement provided, the radial arm 26 has the function of driving the band-wheel 5 as long as a normal resistance opposes the movement of the band 4. However, when an abnormal resistance is set up in opposition to displacement of the band, the spring 28 is caused to yield, with the result that the valve 20 is actuated by the push-rod 30 carried by the stop 27. In consequence, there occurs a reduction in the rate of flow within the pipe 21 and consequently a reduction in the rate of downward travel of the movable work unit 3. It is readily apparent that the conditions in which the valve 20 is actuated can be adjusted at will by means of the screw 29.

A reduction in the rate of downward travel of the movable work unit 3 in the event of an abnormal increase in resistance to the driving tension of the band 4 automatically produces a reduction in said resistance, thus resulting in automatic regulation. This accordingly ensures perfect safety while avoiding any incidents of operation which would otherwise occur in the event of an excessive increase in the resistance set up in opposition to displacement of the band.

Figure 4:
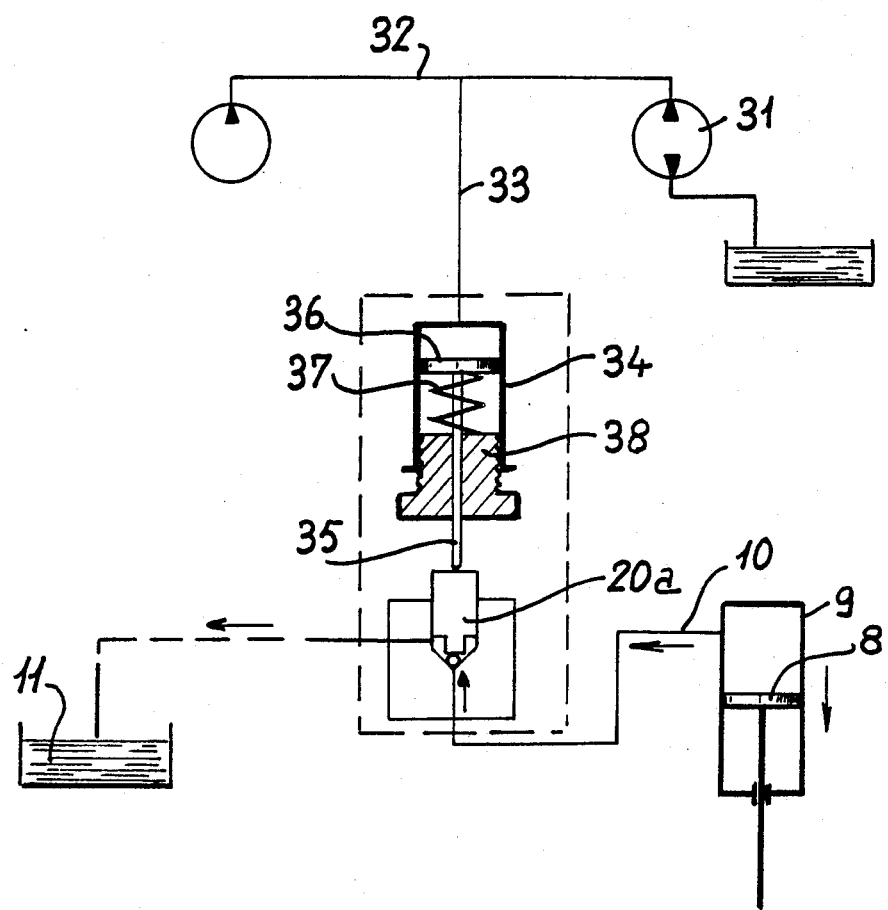
FIG. 4 is a hydraulic diagram of operation contemplated in another embodiment of the sawing machine in accordance with the invention.

FIG. 4 illustrates the hydraulic diagram of operation contemplated in another embodiment of the sawing machine in accordance with the invention. In the particular form of construction considered, the band-driving wheel is driven by a hydraulic motor 31 and no longer by an electric motor as in the embodiment described earlier.

However, as in the previous instance, a valve 20a is provided in the hydraulic braking circuit of the movable work unit 3, said valve being intended to reduce the rate of flow or even to stop this latter in the event of an abnormal increase in resistance to displacement of the band 4.

In this particular form of construction, the hydraulic circuit 32 which supplies the hydraulic motor 31 has a branch line 33 which terminates in a jack 34. The rod 35 of the jack piston 36 is placed opposite to a regulating valve 20a so as to actuate this latter when a pressure rise occurs in the circuit 32 for supplying the motor 31 and therefore when an abnormal increase occurs in the resistance set up in opposition to displacement of the band.

Under normal conditions of operation, the piston 36 is prevented from moving by a spring 37 applied against a screw-plug 38 which seals-off the corresponding end of the jack body 34. Thus by rotating said screw-plug, it is possible to adjust the exact conditions in which the valve 20a is actuated so as to regulate the rate of downward travel of the movable work unit 3 as a function of the resistance set up in opposition to displacement of the band 4. Under these conditions, there is obtained the same result as in the embodiment described earlier.

However, the nature of the means employed for producing action on the valve 20 or 20a which limits the leakage flow rate within the braking circuit could again be different on condition that said means remain responsive to an abnormal increase in resistance to displacement of the saw blade. Thus in the case of the embodiment of FIGS. 1 to 3, it would be possible to provide direct rotational coupling of the band-wheel 5 with its drive shaft 23 in association with a possibility of axial displacement of the worm-gear which forms part of the coupling 24, the flow-limiting valve 20 being placed opposite to said worm-gear so as to be actuated by this latter in the event that an increase in resistance to displacement of the band were to produce, by reaction, an axial displacement of said worm-gear. This would make it possible to obtain the same result as before. Once again, however, consideration could be given to other solutions, whether of mechanical, hydraulic or other types. In the case of the embodiment illustrated in FIGS. 1 to 3, it would be possible to place the safety valve 20 at another point by making arrangements to actuate this latter by means of an auxiliary hydraulic circuit operated in dependence on a control device with cylinder and piston and mounted on the radial arm 26 in order to be actuated by the push-rod 30.

As described earlier, the machine in accordance with the invention has an advantage in that an abnormal increase in the resistance set up in opposition to displacement of the band automatically produces a reduction in the rate of travel of the movable work unit. However, this safety and regulating system has a further advantage in that it can be combined with the safety device which operates under the action of an overload sustained by the same band as is in fact the case with the machine shown in FIGS. 1 to 3. Perfect operational safety of the sawing machine equipped in this manner is accordingly achieved.

However, the sawing machine in accordance with the invention could readily be provided with only the self-regulating system which comes into operation in the event of an increase in the resistance which acts in opposition to forward motion of the saw blade.

Finally, it is worthy of note that the sawing machine in accordance with the invention is not necessarily of the horizontal band type. In fact, the saw band or blade can very readily be disposed vertically opposite to the vise in which the workpiece is clamped in position. Displacement of the movable unit is in that case performed by hydraulic pressure and the rate of travel is reduced by the same safety device as that described earlier.

What is claimed is:

1. A band-sawing machine of the type comprising:
at the location contemplated for the workpiece to be sawn, an assembly movable toward said workpiece, which comprises a saw-band and drive means comprising a rotary flywheel for driving said band, and a hydraulic circuit comprising self-regulating means for limiting automatically the fluid flow in said hydraulic circuit thereby to decrease the velocity of movement of said movable assembly,
said rotary flywheel (5) driving said saw-band (4) being driven by a member (26) coupled to a power shaft (23) of said drive means, a spring (28) disposed between said driving member (26) and said rotary flywheel (5),
said self-regulating means comprising a valve (20) adapted progressively to decrease the fluid flow in said hydraulic circuit controlling the movements of said movable assembly (3),
said valve being mounted between said rotary flywheel (5) and said driving member (26) driving said flywheel, said valve being progressively obturated when the tension imposed on said saw-band (4) by said rotary flywheel (5) increases and said spring (28) is consequently compressed.

2. A band-sawing machine as claimed in claim 1, wherein said rotary flywheel (5) is freely mounted for rotation about said power shaft (23) and said power shaft (23) carries said member (26) which is in the form of a radial arm applied by means of said spring (28) against a fixed stop (27) on said rotary flywheel (5), said valve (20) being carried by said radial arm (26) and being disposed opposite to a valve actuating member (30) carried by said rotary flywheel (5).

* * * * *